H. N. WHITE.
SLIDE TROMBONE.
APPLICATION FILED FEB. 24, 1908.

977,766.

Patented Dec. 6, 1910.

ATTEST
E. M. Fisher
F. C. Mosser

INVENTOR
Henderson N. White
BY Fisher & Moser ATTYS

UNITED STATES PATENT OFFICE.

HENDERSON N. WHITE, OF CLEVELAND, OHIO.

SLIDE-TROMBONE.

977,766.   Specification of Letters Patent.   Patented Dec. 6, 1910.

Application filed February 24, 1908. Serial No. 417,234.

*To all whom it may concern:*

Be it known that I, HENDERSON N. WHITE, a citizen of the United States, residing at Cleveland, in the county of Cuyahoga and State of Ohio, have invented certain new and useful Improvements in Slide-Trombones, and do declare that the following is a full, clear, and exact description of the invention, which will enable others skilled in the art to which it appertains to make and use the same.

My invention relates to improvements in slide trombones, and the invention consists in the construction and combination of parts substantially as shown and described and particularly pointed out in the claims.

Figure 1:
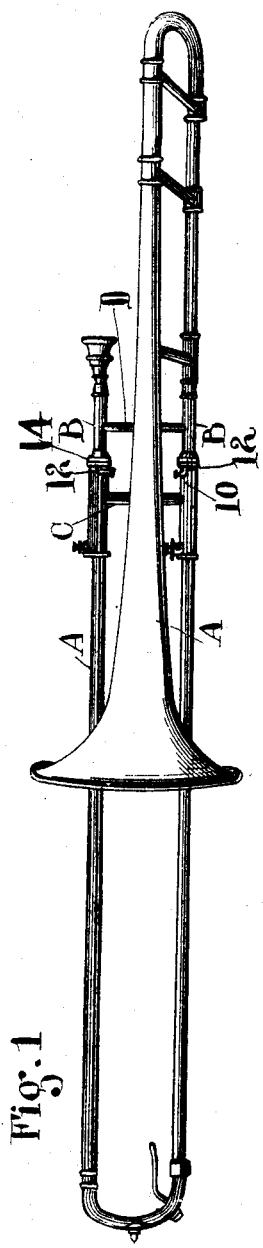
Figure 2:
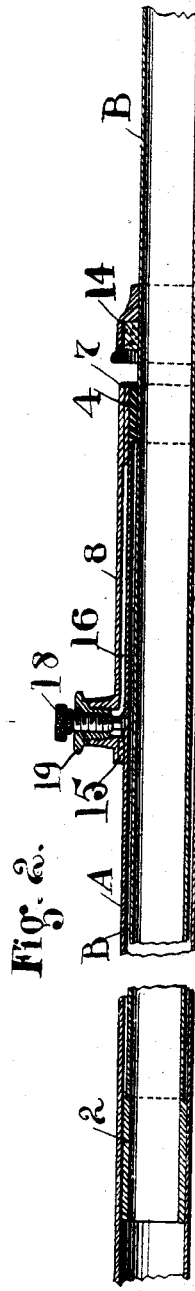
Figure 3:
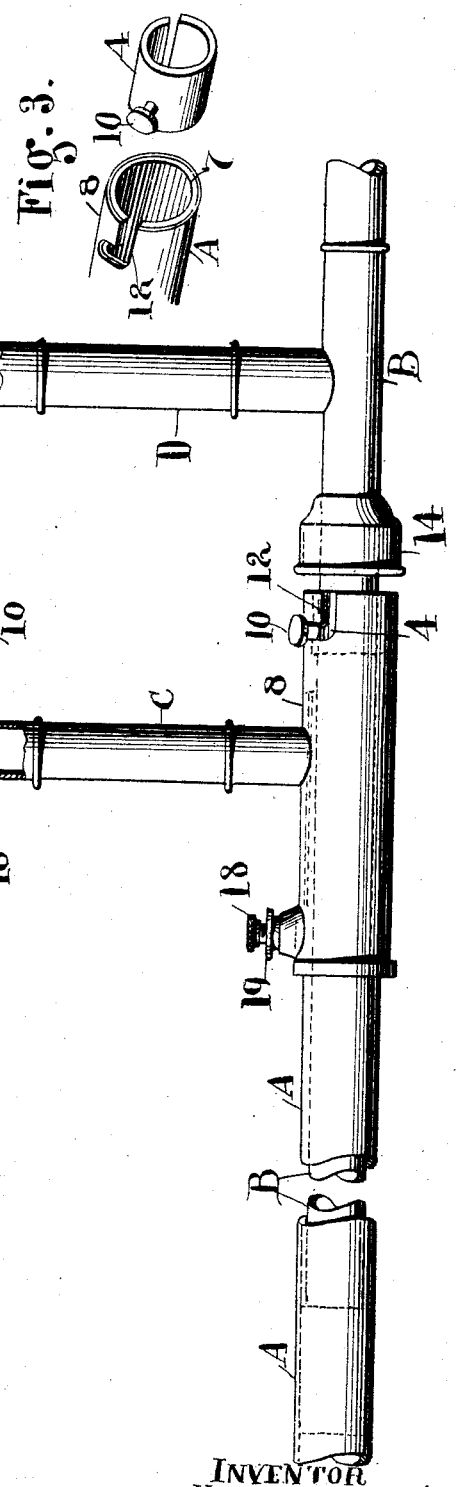

In the accompanying drawings, Figure 1 is a plan view of a complete trombone embodying my invention, and Fig. 2 is an enlarged portion thereof within which the invention is shown in section. Fig. 3 is a perspective view of two details as will hereinafter appear.

The instrument as thus shown comprises the two usual main parts or members of a slide trombone, indicated by A and B respectively and slidably mounted one in respect to or upon or within the other according to the point of view, and not differing in this particular from this style of trombone as heretofore made except in the essential features which constitute this invention and as will now appear. Thus, it is to be observed that pipes or tubes of the inner member B are visibly smaller in cross section than the bore of the tubes or pipes of outer member A in the proportion about as shown, so that said pipes are wholly out of contact or touch between their ends and have a free open space between them all around except at the two bearing points indicated by 2 and 4, respectively. The outer bearing portion 2 is referred to herein also as a piston, and consists of an annular enlargement of suitable metal or other material fixed in the inner ends of said part B and of suitable construction and length to avoid side strain or pinching on any portion of its surface when the parts are operated. Corresponding bearing 4 is interposed between said tubes or pipes at the ends of outer member A above cross brace C and adapted to produce a smooth and easy bearing relation between said parts at this point corresponding to the bearing in and through pistons 2.

This bearing 4 consists in a split ring, which for convenience of construction is set at the end of pipe A and flush therewith over its outer surface but with thickness enough to take up the annular open space between pipes A and B and thus fit comfortably upon pipe B and form the smooth and easy bearing desired to match piston or pistons 2 in this particular. An extension sleeve 7 engaged on or over each end of pipe A overlaps said bearing member and incloses the same about its outside, while an outer sleeve or tube 8 overlaps sleeve 7 and incloses the same and serves a further purpose presently to be seen. The two sleeves 7 and 8 are permanently fixed together and upon pipe A next behind bearing 4 and constituting a housing for said bearing. As to this construction, it is to be understood that it is the preferable one but not the only one that can be employed, because I might use a thinner bearing ring 4 and interpose it between the ends of part A and part B and get an equivalent construction and effect. However, since I necessarily have outer sleeve 8 for another purpose I can extend it with advantage, as shown, over the sub-sleeve 7 and make a housing for said bearing 4. It is to be observed also that said bearing ring 4 is an independent member separably engaged with the ends of part A and sleeved over and adapted to slide upon pipe B when in use, as seen in Fig. 2. To this end the said bearing member has a headed pin or screw 10 adapted to run into and lock in bayonet slot 12 in the end or ends of the extension of pipe A and which is considered as a part thereof for all practical purposes, and so indicated in Fig. 3. This ring or bearing 4 is thus made removable by simply rotating the same to disengage its headed stem 10 from or in slot 12, when it is released from part A and remains loose upon pipe B. The two parts A and B can then be bodily separated by withdrawing one from the other. Otherwise the bearing sleeves 4 form a stop for pistons 2 on the ends of part A as the said part is carried to the limit of its movement in that direction. At the opposite end or in the opposite direction of movement the cushioning thimbles 14 fixed upon pipes B fix the limit of sliding movement.

Two advantages accrue by making the bearing ring 4 a split part in this, that thereby it can be spread and sprung into position upon pipe B, and the split therein affords a vent for air space between the two pipes between bearings 2 and 4. A different vent might of course be provided but this construction serves the purpose. Now, as to the further utility of outer sleeve 8 above described it is seen that said sleeve is spaced from pipe A between its ends by sub-sleeve 7 at one end and a spacing ring 15 at the other and both of which parts are sealed without and within to make an oiling or lubricating chamber or space —16— between pipe A and sleeve 8, as shown. This space may be given more or less capacity by building sleeve 8 farther out in respect to pipe A, and oil is admitted into the open space between pipes A and B to lubricate bearings 2 and 4 by means of screw valve 18 set into screw plug 19 in sleeve 8 and having a suitable point adapted to set in a relatively small inlet opening in pipe A at the point of said valve and through which oil is admitted for the purpose set forth.

A distinctive feature is the lubricating device, or oiler. By filling the reservoir with oil, a month's supply will be under the direct control of the performer as regulated by the small thumb screw situated on the top and bottom of the slide, respectively.

What I claim is:—

1. A slide trombone having an inner member with bearing portions on its ends, an outer member and band shaped bearing members at its ends sleeved over said inner member and detachably interlocked with the ends of the said outer member.

2. A slide trombone comprising an outer member having oiling chambers about its outside at its ends and valved openings between the walls of said outer member and said chambers, an inner member slidably mounted in said outer member and said valved openings entering the space between the said members, thereby lubricating said parts.

3. A slide trombone having an inner member and an outer member with two ends and a sleeve about each end hermetically sealed at its end to prevent leakage, an oil inlet opening in the wall of said outer member to lubricate the space between said members and a valve for said opening.

In testimony whereof I sign this specification in the presence of two witnesses.

HENDERSON N. WHITE.

Witnesses:
E. M. FISHER,
P. J. ST. CLAIR.